(12) United States Patent
Baba

(10) Patent No.: US 8,718,248 B2
(45) Date of Patent: May 6, 2014

(54) COMMUNICATION APPARATUS

(75) Inventor: Tsuyoshi Baba, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/601,908

(22) Filed: Aug. 31, 2012

(65) Prior Publication Data

US 2013/0083910 A1 Apr. 4, 2013

(30) Foreign Application Priority Data

Sep. 30, 2011 (JP) ................. 2011-216228

(51) Int. Cl.
H04M 11/00 (2006.01)

(52) U.S. Cl.
USPC ............... 379/100.01; 379/90.01; 379/93.09; 379/399.01; 379/377; 379/106.08

(58) Field of Classification Search
USPC ............... 379/100.01, 399.01, 377, 106.08
See application file for complete search history.

(56) References Cited

U.S. PATENT DOCUMENTS

2002/0080952 A1* 6/2002 Sonnleithner ................. 379/377
2005/0031098 A1 2/2005 Ito
2006/0233329 A1* 10/2006 Ito ........................... 379/100.01

FOREIGN PATENT DOCUMENTS

JP 2005-057659 A 3/2005

* cited by examiner

Primary Examiner — Joseph J Nguyen
(74) Attorney, Agent, or Firm — Baker Botts L.L.P.

(57) ABSTRACT

A communication apparatus, which is connected to a phone line, and to which an external telephone is connectable to. The communication apparatus includes: a line-voltage detecting unit which detects a line voltage; a communication-signal detecting unit which performs detection on a communication signal, which is input to the communication apparatus from the phone line or from the external telephone upon the external telephone is hooked up; and a control device which performs a hook-up determining process of determining that the external telephone is in a hook-up state when the line voltage detected by the line-voltage detecting unit is equal to or less than a first threshold value and the communication signal is detected by the communication-signal detecting unit.

9 Claims, 4 Drawing Sheets

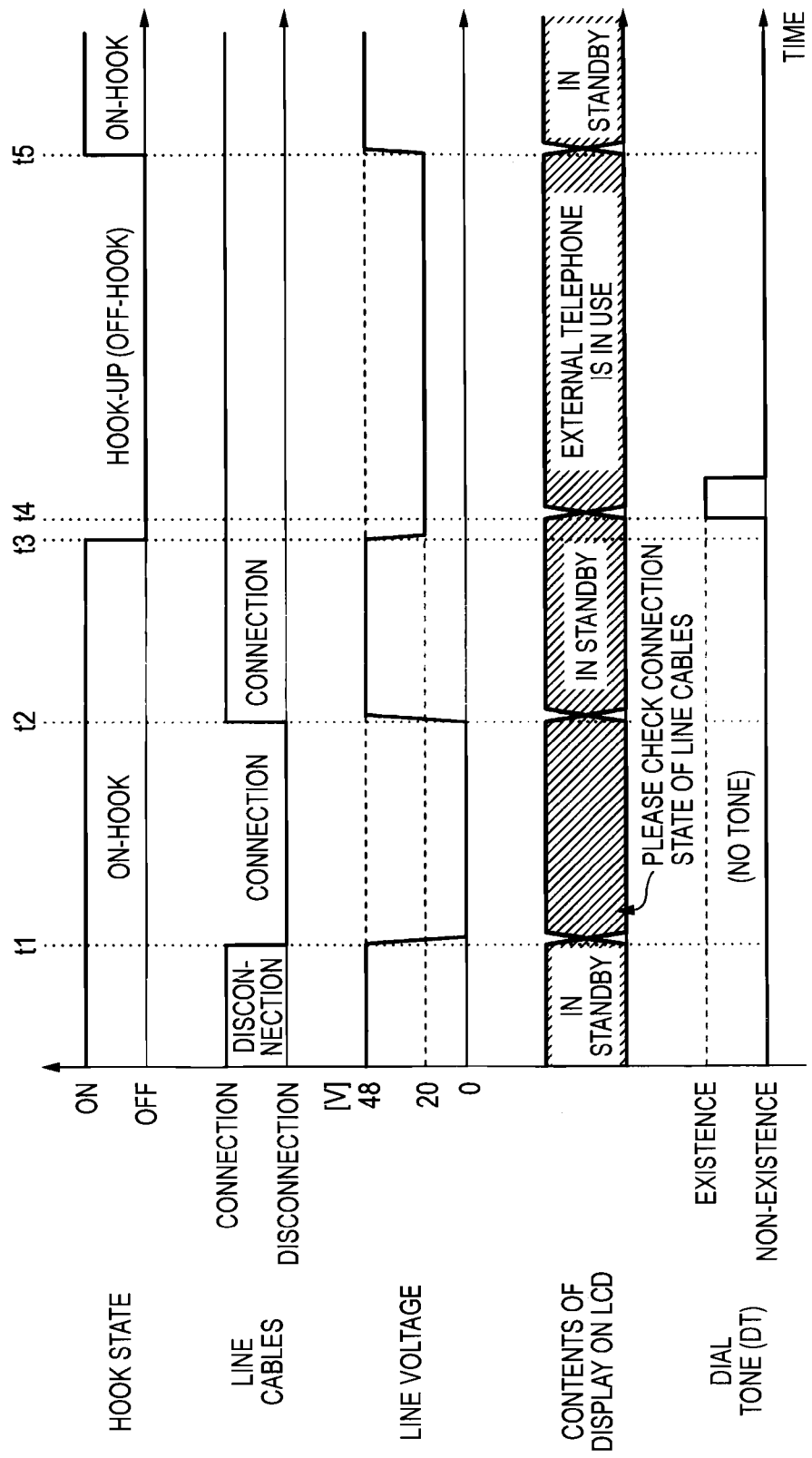

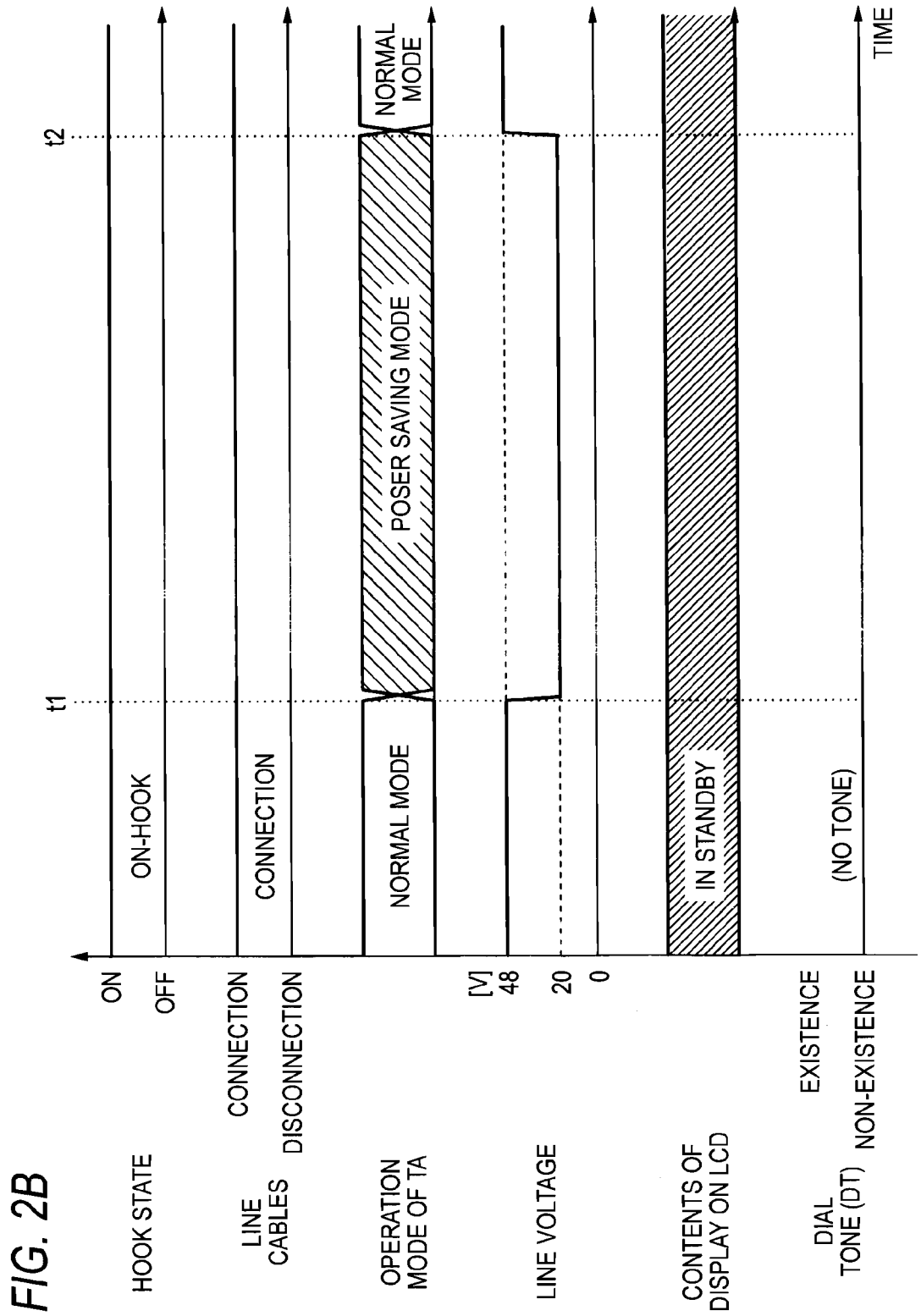

COMMUNICATION APPARATUS

CROSS-REFERENCE TO RELATED APPLICATIONS

This application claims priority from Japanese Patent Application No. 2011-216228 filed on Sep. 30, 2011, the entire subject matter of which is incorporated herein by reference.

TECHNICAL FIELD

The present invention relates to a communication apparatus configured to be connected to a phone line, and specifically, to a communication apparatus configured to be capable of being connected to an external telephone.

BACKGROUND

As communication apparatuses which are connected to phone lines for the purpose of use, there are facsimile machines having a facsimile function, and so-called multi-function devices having not only the facsimile function but also other functions such as a printer function. Each of these communication apparatuses has a connection terminal, in addition to a line connection terminal which is a terminal (i.e., plug-in phone jack) for connecting the communication apparatus to a phone line. The phone connection terminal is for connection with a separate telephone outside the apparatus and is connected in parallel to the line connection terminal inside the communication apparatus. In the following description, unless otherwise noted, the term "communication apparatus" means a communication apparatus having a phone connection terminal for connection with an external telephone.

This communication apparatus determines whether an external telephone is in use or not. When it is determined that the external telephone is in use, the communication apparatus performs display on a display screen (for example, an LCD) to notify that the external telephone is in use or prevents communication through the phone line from being performed. According thereto, the communication apparatus provides convenience to both of a user of the external telephone and a user of the communication apparatus.

The communication apparatus determines whether the external telephone is in use, on the basis of whether the external telephone is in a hook-up (or off-hook) state. When the external telephone is not in the hook-up state, the communication apparatus determines that the external telephone is not in use; whereas when the external telephone is in the hook-up state, the communication apparatus determines that the external telephone is in use.

In the related art, detection on hook-up of the external telephone is performed by detecting a current flowing in the phone line. As is well known, while a telephone connected to a phone line is in an on-hook state, the phone line is open, and thus any current does not flow. Meanwhile, when the telephone becomes the hook-up state, the phone line is closed by the telephone such that a DC loop is formed between the telephone and a phone line side (a telephone exchange system), and a current flows in the phone line. Therefore, it is possible to perform detection on hook-up of the external telephone by detecting a current flowing in the phone line.

However, in the configuration according to the related art in which detection on hook-up is performed on the basis of current detection, it is necessary to provide a current detecting circuit on the primary side, and to use, for example, an optical coupler to insulating the primary side from the secondary side. For this reason, as the current detecting circuit, a large and expensive circuit should be used.

Recently, silicon data access arrangement (SDAA) has been used as an interface (line I/F) to be connected to a phone line. The SDAA has a function of detecting a voltage of a phone line (hereinafter, referred to as a line voltage), in addition to basic functions such as detection on polarity reversion, detection on various signals such as a call signal, and closing or opening of a phone line. The line voltage means an intercable voltage between two conductive cables constituting the phone line. Therefore, the line-voltage detecting function of the SDAA can be used to detect hook-up of the external telephone.

In other words, while the external telephone is in the on-hook state, that is, the phone line is open, the line voltage is maintained at a predetermined voltage (which is about 48V, for example, and will also be referred to as a steady voltage). Whereas, when the external telephone is hooked up such that the phone line is closed, as described above, a DC loop is formed and a current flow. As a result, the line voltage is reduced up to about half of the steady voltage (for example, several tens of voltages). Therefore, it is possible to perform detection on hook-up of the external telephone by detecting a reduction in the line voltage to about half of the steady voltage.

When the line-voltage detecting function of the SDAA is used to perform detection on hook-up of the external telephone, at least, it become unnecessary to provide a current detecting circuit on the primary side, and thus it is possible to reduce the size and cost of the communication apparatus.

SUMMARY

Illustrative aspects of the present invention provide a communication apparatus, which is configured to be connected to a phone line, to which an external telephone is connectable, and which is configured to accurately perform detection on hook-up of an external telephone on the basis of a reduction in a line voltage without erroneously detecting a reduction in the line voltage attributable to any factor other than hook-up of the external telephone as hook-up of the external telephone.

According to one illustrative aspect of the present invention, there is provided a communication apparatus which is configured to be connected to a phone line, and to which an external telephone is connectable to. The communication apparatus includes: a line-voltage detecting unit configured to detect a line voltage which is a voltage of the phone line; a communication-signal detecting unit configured to perform detection on a communication signal, which is input to the communication apparatus from the phone line or from the external telephone upon the external telephone is hooked up; and a control device configured to perform a hook-up determining process of determining that the external telephone is in a hook-up state when the line voltage detected by the line-voltage detecting unit is equal to or less than a first threshold value and the communication signal is detected by the communication-signal detecting unit.

BRIEF DESCRIPTION OF THE DRAWINGS

FIGS. 2A and 2B are timing charts illustrating examples of the operation of the multi-function device according to the exemplary embodiment.

DETAILED DESCRIPTION

<General Overview>

Figure 1:
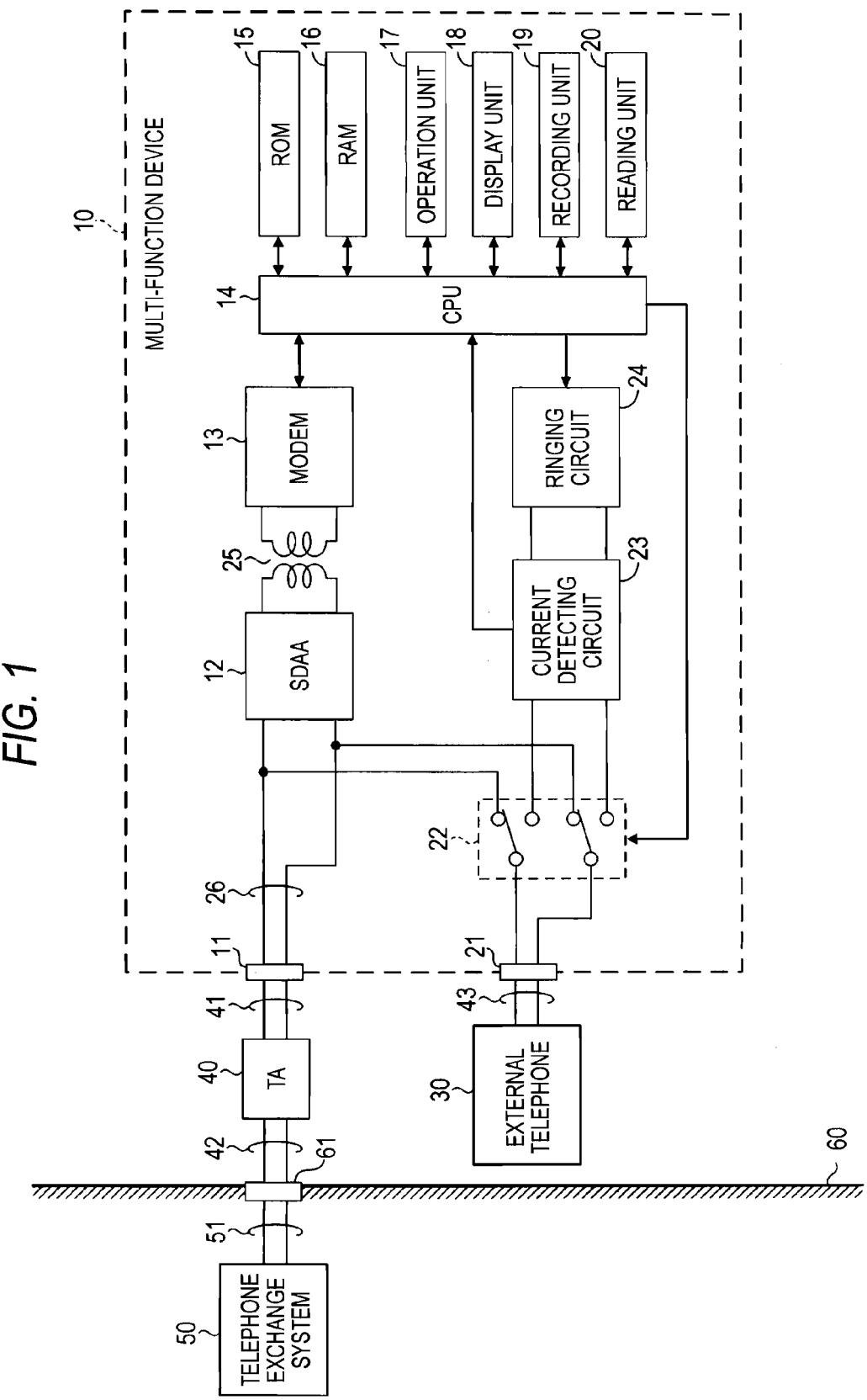
FIG. 1 is a schematic view illustrating a schematic configuration of a multi-function device according to an exemplary embodiment of the present invention.

In a case where communication apparatuses are directly connected to phone lines, the method of performing detection on hook-up of the external telephone on the basis of the line voltage can be put to practical use without any problem. However, in a case where communication apparatuses are connected to phone lines through various communication relaying apparatuses, when the above-described method is put to practical use, problems may occur.

For example, in a case where a user wants to use a communication apparatus corresponding to the above-described analog phone line for facsimile communication or a voice call on an external telephone, in a case where the user is a subscriber for an ISDN line, the user needs to connect the phone connection terminal of the communication apparatus and an analog phone port of a terminal adapter (TA) with a line cable (plug-in phone jack) such that the communication apparatus is connected to the ISDN line through the TA. Meanwhile, in a case where the user is a subscriber for an optical line, the user needs to connect a line connection terminal of the communication apparatus and an analog phone port of an adapter for optical telephones with a line cable, such that the communication apparatus is connected to the optical line through the adapter.

Communication relaying apparatuses for TAs, adapters, and like artificially generate various signals or the like, which are generally output from telephone exchange systems, and output the signals to communication apparatuses. Specifically, when communication such as a call or a facsimile communication is not being performed, the communication relaying apparatuses apply the steady voltage (for example, 48V) to line cables connected to the communication apparatuses. Further, according to whether communication such as a call or a facsimile communication is being performed, in place of the telephone exchange systems, the communication relaying apparatuses transmit or receive various signals to or from the communication apparatuses and perform various other processes such as polarity reversion. Accordingly, the line cables connecting the communication apparatuses and the communication relaying apparatuses such as TAs and the like act equivalently to phone lines such that, as seen from the communication apparatuses or the external telephones, the connection states are equivalent to the states in which the communication apparatuses are directly connected to the phone lines. Therefore, users can use the communication apparatuses corresponding to the analog phone lines.

However, among the communication relaying apparatuses for TAs, adapters, and the like, there are many communication relaying apparatuses having various additional functions. One of these additional functions is a power saving function of reducing a voltage to be applied to a line cable when communication is not being performed, so as to save power. In general, those communication relaying apparatuses maintains line voltages (here, the inter-cable voltages between the line cables) at the steady voltage, similarly to general phone lines. However, when communication is not performed for a predetermined time period, the communication relaying apparatuses transitions to a power saving mode in which the line voltages is reduced to about half of the steady voltage to save power.

When the communication relaying apparatuses for TAs and the like transition to the power saving mode, the communication apparatuses connected thereto may erroneously detect a reduction in the line voltage in the power saving mode as hook-up of a communication apparatus. Therefore, although the external telephones are actually not in use (the external telephones are in the on-hook state), the communication relaying apparatuses perform various processes which should be performed when the external telephone is in use. For example, the communication relaying apparatuses may perform display to inform that the external telephone is in use.

The present invention was made considering the above-described problems, and illustrative aspects of the present invention provide a communication apparatus, which is configured to be connected to a phone line, to which an external telephone is connectable, and which is configured to accurately perform detection on hook-up of an external telephone on the basis of a reduction in a line voltage without erroneously detecting a reduction in the line voltage attributable to any factor other than hook-up of the external telephone as hook-up of the external telephone.

According to one illustrative aspect of the present invention, there may be provided a communication apparatus which is configured to be connected to a phone line, and to which an external telephone is connectable to. The communication apparatus includes: a line-voltage detecting unit configured to detect a line voltage which is a voltage of the phone line; a communication-signal detecting unit configured to perform detection on a communication signal, which is input to the communication apparatus from the phone line or from the external telephone upon the external telephone is hooked up; and a control device configured to perform a hook-up determining process of determining that the external telephone is in a hook-up state when the line voltage detected by the line-voltage detecting unit is equal to or less than a first threshold value and the communication signal is detected by the communication-signal detecting unit.

The communication apparatus having the above-described configuration performs detection on hook-up of the external telephone on the basis of both of a reduction in the line voltage (line voltage of the first threshold value or less) and detection on the communication signal, unlike the related art in which detection on hook-up is performed on the basis of only a reduction in the line voltage.

When the line voltage is reduced due to any factor other than hook-up of the external telephone, the communication signal is not input from the phone line side or the external telephone. The reason is that the communication signal can be transmitted and received in so-called call control that is performed between the external telephone and the phone line side by hook-up of the external telephone.

Therefore, even if the line voltage is reduced due to any factor (for example, a transition of a terminal adapter (TA) having a power saving mode to the power saving mode in a case where the TA is connected between the communication apparatus and the phone line) other than hook-up of the external telephone, it is possible to prevent that it is erroneously determined that the external telephone is in the hook-up state, on the basis of the reduction of the line voltage. In other words, according to the communication apparatus of the present invention, it is possible to accurately detect hook-up of the external telephone, without any errors.

As the communication signal which is a detection target of the communication-signal detecting unit, various signals, such as a dial tone or a ringing tone from the phone line side, a selection signal from the external telephone, and reversion of polarity of phone line, which can be transmitted and received between the external telephone and the phone line after hook-up of the external telephone can be used. According to another illustrative aspect of the present invention, for the communication signal which is a detection target of the communication-signal detecting process, it is preferable to use a dial tone that is input from the phone line.

A dial tone is a signal that is generally first input among various signals and the like which can be input from the phone line or the external telephone after hook-up of the external telephone. For this reason, when detection on hook-up is performed by detecting a dial tone after detection of a reduction in the line voltage, it is possible to quickly determine hook-up of the external telephone.

As factors of a reduction in the line voltage, in addition to hook-up of the external telephone, a voltage reducing function of a communication device such as the TA exemplified above, and the like, it can also be considered that the connection state between the communication apparatus and the phone line is not normal (for example, they are physically disconnected from each other).

Thus, according to still another illustrative aspect of the present invention, the control device may be configured to further perform: a voltage determining process of determining whether the line voltage detected by the line-voltage detecting unit is equal to or less than a second threshold value that is smaller than the first threshold value; and a line-connection-state determining process of determining that a connection state between the communication apparatus and the phone line is not connection when the voltage determining process determines that the line voltage is equal to or less than the second threshold value.

According thereto, even if the line voltage is reduced by release of the connection between the communication apparatus and the phone line, it is not erroneously detected that the external telephone is in the hook-up state, on the basis of the reduction of the line voltage. Further, the factor of the reduction of the line voltage is concretely specified (as a defect in the line connection). Therefore, it is possible to provide a high value-added communication apparatus.

According to still another illustrative aspect of the present invention, the control device may be configured to further perform a connection-state notifying process of notifying that the connection state is not connection if the line-connection-state determining process determines that the connection state is not connection.

According thereto, in a case where the line voltage is reduced due to any defect in the line connection, it is notified that the reduction of the line voltage is attributable to any defect in the line connection. For this reason, the use can recognize that there is any defect (defect in the line connection), and appropriately deal with the defect. Therefore, it is possible to provide a user-friendly communication apparatus.

According to a still another illustrative aspect of the present invention, the communication apparatus may further include a facsimile transceiver unit configured to perform transmission and reception of facsimile signals. The facsimile transceiver unit may include, as operation modes, at least a normal mode in which transmission and reception of the facsimile signals are possible and a power saving mode in which power consumption is less than that in the normal mode. If the line-connection-state determining process determines that the connection state is not connection when the facsimile transceiver unit is in the normal mode, the facsimile transceiver may be configured to perform transition to the power saving mode.

In a case where there is any defect in the line connection, it is highly possible that transmission and reception of facsimile signals cannot also be normally performed. For this reason, if transmission and reception of facsimile signals cannot be normally performed, it is a waste of power to continuously operate the facsimile transceiver unit in a normal mode.

In the case where there is any defect in the line connection, when the operation mode of the facsimile transceiver unit is switched to the power saving mode, it is possible to suppress wasteful power consumption.

Further, according to still another illustrative aspect of the invention, the control device may be configured to further perform a hook-up notifying process of notifying that the external telephone is in the hook-up state when the hook-up determining process determines that the external telephone is in the hook-up state.

According thereto, when it is determined that the external telephone is in the hook-up state, the hook-up state of the external telephone is notified. In other words, in a case where the line voltage is reduced, when any communication signal is not input, notification representing that the external telephone is in the hook-up state is not performed. Notification representing that the external telephone is in the hook-up state is performed in the case where the line voltage is reduced and the communication signal is input, that is, a case where hook-up of the external telephone is reliably detected.

Therefore, the user can accurately recognize whether the external telephone is in the hook-up state, and it is possible to provide a user-friendly communication apparatus.

According to still another illustrative aspect of the present invention, there may be provided a multi-function device which is configured to be connected to a phone line and to which an external telephone is connectable to. The multi-function device includes a printing unit, a scanner unit, and a facsimile transceiver unit configured to perform transmission and reception of facsimile signals. The multi-function device includes: a line-voltage detecting unit configured to detect a line voltage which is a voltage of the phone line; a communication-signal detecting unit configured to perform detection on a communication signal, which is input to the multi-function device from the phone line or from the external telephone upon the external telephone is hooked up; a hook-up determining unit configured to determine that the external telephone is in a hook-up state when the line voltage detected by the line-voltage detecting unit is equal to or less than a first threshold value and the communication signal is detected by the communication-signal detecting unit; a voltage determining unit configured to determine whether the line voltage detected by the line-voltage detecting unit is equal to or less than a second threshold value that is smaller than the first threshold value; and a line-connection-state determining unit configured to determine that a connection state between the multi-function device and the phone line is not connection when the voltage determining unit determines that the line voltage is equal to or less than the second threshold value.

<Exemplary Embodiments>

Hereinafter, exemplary embodiments of the present invention will be described with reference to the accompanying drawings.

A multi-function device 10 according to the exemplary embodiment includes a plurality of functions such as a facsimile communication function, a relay function for external telephones, a copy function, and a scanner function, and includes a line connection terminal 11 for connection with a phone line, and a phone connection terminal 21 for connection with an external telephone, as shown in FIG. 1. Both of the connection terminals 11 and 21 are composed of plug-in phone jacks having the same shape and are provided at one side of the multi-function device 10.

The multi-function device 10 includes a SDAA 12, a modem 13, a CPU 14, a ROM 15, a RAM 16, an operation unit 17, a display unit 18, a recording unit 19 (one example of a printing unit), a reading unit 20 (one example of a scanner unit), a relay 22, a current detecting circuit 23, and a ringing circuit 24.

FIG. 1 shows a case where the multi-function device 10 is used at a home of a user who is a subscriber for an ISDN line, as an example of use manners of the multi-function device 10. In this case, the line connection terminal 11 is connected to an analog port of a terminal adapter (TA) 40 by line cables (plug-in phone jack) 41. An ISDN port of the TA 40 is connected to a wall surface terminal 61 provided to a wall 60 of a house or the like, by line cables 42, and is connected to an external ISDN line 51 and a telephone exchange system 50 through the wall surface terminal 61.

Further, the TA 40 is a known communication relaying apparatus for connecting various communication terminal devices such as personal computers and telephones to ISDN lines. In the following description, in order to distinguish line cables 41 and 42, the line cables 41 connecting the line connection terminal 11 of the multi-function device 10 and the analog port of the TA 40 are referred to phone cables 41, and the line cables 42 connecting the ISDN port of the TA 40 and the wall surface terminal 61 are referred to as ISDN line cables.

The phone cables 41 connecting the line connection terminal 11 of the multi-function device 10 and the analog port of the TA 40 artificially becomes equivalent to an analog phone line by a known function of the TA 40. In other words, when any call or facsimile communication is not being performed, the TA 40 applies a steady voltage (for example, 48V) to the phone cables 41 connected to the analog port. Further, in response to whether any call or facsimile communication is being performed, in place of telephone exchange systems, the TA 40 transmits or receives various signals to or from the multi-function device 10, or performs various other processes such as polarity reversion. Therefore, the line connection terminal 11 of the multi-function device 10 can be artificially considered as connected to a public phone line.

The TA 40 according to the exemplary embodiment has a power saving function. In other words, although the TA 40 generally applies the steady voltage (48V) to the analog port side, when the multi-function device 10 is not used for facsimile communication or an external telephone 30 is not used for a voice call for a predetermined time period, the operation mode of the TA 40 transitions to the power saving mode. Specifically, the TA 40 reduces the voltage to be applied to the analog port side, to half of the steady voltage (for example, about 20V).

The phone connection terminal 21 of the multi-function device 10 is connected to the external telephone 30 by line cables 43. The external telephone 30 is a known telephone corresponding to an analog phone line. Therefore, it is sure that it is also possible to directly connect the external telephone 30 to the analog port of the TA 40. However, in the present exemplary embodiment, the multi-function device 10 is connected to the analog port of the TA 40. Therefore, the external telephone 30 is directly connected to the phone connection terminal 21 of the multi-function device 10, and is connected to the analog port of the TA 40 through the multi-function device 10.

In the present exemplary embodiment, since it is assured that a user uses an ISDN line as a public network, the multi-function device 10 is connected to the ISDN line 51 through the TA 40. However, in a case where the public network is an analog phone line, it is only necessary to connect the multi-function device 10 to the phone line (that is, it is only necessary to directly connect the line connection terminal 11 and the wall surface terminal 61 with line cables).

The line connection terminal 11 of the multi-function device 10 is connected to the SDAA 12 through line connection wires 26 inside the multi-function device 10. The phone connection terminal 21 is connected in parallel to the line connection wires 26 through a relay 22 inside the multi-function device 10. Consequently, the phone connection terminal 21 is connected to the line connection terminal 11 through the relay 22.

The relay 22 is to selectively switch a connection destination of the phone connection terminal 21 in the multi-function device 10 between the line connection wires 26 (that is, the line connection terminal 11) and the ringing circuit 24 side, and is controlled (turned on or off) according to a relay control signal from the CPU 14. In other words, the CPU 14 outputs any one of a relay-on signal and a relay-off signal as the relay control signal.

When the CPU 14 outputs the relay-off signal, the relay 22 becomes a normal state in which any current does not flow in relay coils (not shown). In this normal state, individual contact points become in a state as shown in FIG. 1, such that the phone connection terminal 21 is connected to the line connection terminal 11. In other words, in the normal state in which any current does not current in the relay coils, the external telephone 30 is connected to the analog port of the TA 40 through the line connection terminal 11.

When the CPU 14 outputs the relay-on signal to the relay 22, the relay 22 becomes a relay-on state in which a current flows in the relay coils. In this relay-on state, the individual control points are switched from the state shown in FIG. 1 such that the phone connection terminal 21 is connected to the ringing circuit 24 side. Consequently, in the relay-on state in which a current flows in the relay coils, the external telephone 30 is connected to the ringing circuit 24 side inside the multi-function device 10, without being connected to the TA 40. The entire circuit connecting the line connection terminal 11 and the phone connection terminal 21 and including the relay 22 and the line connection wires 26 is one example of a connection circuit of the present invention.

The SDAA 12 is a known module that can be used as an interface for connection with analog phone lines. In response to various commands input from the CPU 14 through the modem 13, the SDAA 12 is configured to close or open a phone line (the phone cables 41 connected to the analog port of the TA 40 in the present exemplary embodiment), perform detection on various input signals (such as a call signal, a dial tone, a CNG signal, and the like) from the phone line, output various output signals (such as a number selection signal, a DIS signal, and the like) to the phone line, or perform other processes.

In order to insulate a primary side (including the SDAA 12 and the line connection terminal 11) and a secondary side (including the modem 13 and the CPU 14) from each other in direct-current wise, the SDAA 12 is connected to the modem 13 through a transformer 25. Power for the operation of the SDAA 12 is supplied from the modem 13 through the transformer 25. Transmission and reception of various signals and the like between the SDAA 12 and the modem 13 is also performed through the transformer 25.

The SDAA 12 also has a function of detecting the inter-line voltage between the line connection lines 26, that is, the line voltage of the public line connected to the line connection terminal 11. In the present exemplary embodiment, since the line connection terminal 11 is connected to the analog port of the TA 40 through the phone cables 41, the SDAA 12 detects the inter-cable voltage between the phone cables 41 as the line voltage. The SDAA 12 can transmit various reception signals and the detected line voltage to the CPU 14 through the modem 13. Incidentally, the SDAA 12 is one example of a line-voltage detecting unit and a communication-signal detecting unit.

The modem 13 has basic functions of modulating or demodulating facsimile signals transmitted or received in facsimile communication. Further, in response to commands from the CPU 14, the modem 13 controls the SDAA 12, outputs various signals and the like to the SDAA 12, receives various input signals, the line voltage, and the like from the SDAA 12, or performs other processes.

For example, as for the line voltage, the modem 13 periodically obtains the line voltage detected by the SDAA 12, from the SDAA 12, and stores the line voltage. Further, in response to a request from the CPU 14, the modem 13 outputs the stored latest line voltage to the CPU 14 (Or, the modem 13 itself regularly outputs the stored latest line voltage to the CPU 14). Meanwhile, as for a dial tone, for example, the dial tone is input from the phone line side. Upon the SDAA 12 receives the dial tone, the modem 13 records the reception of the dial tone, and the modem 13 notifies the reception of the dial tone to the CPU 14 in response to a request from the CPU 14 (or the modem 13 itself notifies the reception of the dial tone to the CPU 14).

The CPU 14 implements various functions of the multi-function device 10 such as facsimile transmission and reception, detection on hook-up of the external telephone 30, control on the relay 22, control on the ringing circuit 24, detection on the connection state of the line cables, and the like, on the basis of various programs stored in the ROM 15.

The ROM 15 stores various programs to be executed by the CPU 14, option values, and the like. The RAM 16 may be used as an operation area when the CPU 14 executes various programs. The operation unit 17 is provided on a surface of the case of the multi-function device 10. The operation unit 17 includes various buttons, a touch panel, or the like to receive various kinds of operation input from a user. The display unit 18 is provided on a surface of the case of the multi-function device 10. The display unit 18 is configured to display various information such as the operation state of the multi-function device 10, various option contents, and the like. In the present exemplary embodiment, the display unit 18 is composed of a liquid crystal display (LCD).

The recording unit 19 records (prints) various images, such as facsimile reception images received by the facsimile communication function, images read by the reading unit 20, and the like, on recording media such as a printing sheet and the like. The reading unit 20 reads images of documents which are read subjects in facsimile transmission.

A call signal (ring signal) is generally input from an external phone line when receiving an incoming call. In the present exemplary embodiment, in response to a command from the CPU 14, the ringing circuit 24 artificially generates the call signal (ring signal) and outputs the call signal (ring signal) to the external telephone 30 through the relay 22. Therefore, in a case where the relay 22 is in the relay-on state in which the external telephone 30 is connected to the ringing circuit 24 side, when the ringing circuit 24 outputs the artificial call signal, the artificial call signal is input to the external telephone 30 through the relay 22, so that the external telephone 30 rings. The operations of the ringing circuit 24, the relay 22, and the current detecting circuit 23 connected therebetween will be described below in detail.

The current detecting circuit 23 is provided between the ringing circuit 24 and the relay 22 on a connection line provided from the ringing circuit 24 to the external telephone 30 through the relay 22. The current detecting circuit 23 is configured to detect a current flowing in the corresponding connection line and output the detection result to the CPU 14. The ringing circuit 24 applies a predetermined voltage between connection lines on its output side. Therefore, upon the external telephone 30 is hooked up when the relay 22 is in the relay-on state, a closed loop is formed on the output side of the ringing circuit 24, and a current flows in the connection lines between the ringing circuit 24 and the external telephone 30. When the current flows in the connection lines, the current detecting circuit 23 detects the flow of the current and notifies the flow of the current to the CPU 14.

Next, the operation of the multi-function device 10 will be described in more detail.

First, an operation when receiving an incoming call will be described. When a call signal is input from the phone line (from the TA 40 in the present exemplary embodiment) by calling from the outside, the call signal is received by the SDAA 12 in the multi-function device 10 and is also output to the external telephone 30 through the relay 22. Upon receiving the call signal, the external telephone 30 rings. Further, in the multi-function device 10, when the CPU 14 senses that the SDAA 12 has received the call signal, the CPU 14 outputs a ringing tone from a speaker (not shown). Consequently, when receiving the incoming call, both of the multi-function device 10 and the external telephone 30 ring.

When the external telephone 30 is hooked up within a predetermined time (for example, within about three seconds) after the start of the ringing, the CPU 14 detects the hook-up, and displays 'EXTERNAL TELEPHONE IS IN USE' on the LCD of the display unit 18 while stopping receiving facsimile communication until the call through the external telephone 30 is terminated (that is, until the external telephone 30 becomes the on-hook state).

Incidentally, detection on hook-up of the external telephone 30 by the CPU 14 when receiving the incoming call is performed on the basis of the line voltage detected by the SDAA 12. In other words, when the external telephone 30 is hooked up, the line is closed by the external telephone 30, such that a DC closed-loop is formed between the analog port of the TA 40 and the external telephone 30. Therefore, the line voltage is reduced from the steady voltage (about 48V in the present exemplary embodiment) to about several tens of voltages. On the basis of the reduction of the line voltage, the CPU 14 determines that the external telephone 30 has been hooked up.

When the incoming call is received, the multi-function device 10 (CPU 14) can detect that the incoming call has been received on the basis of a call signal from the phone line side. Further, at least at the time when the TA 40 outputs the call signal by reception of the signal, the TA 40 is in a normal operation mode, not in the power saving mode. Therefore, when the incoming call is received, the CPU 14 can perform detection on hook-up of the external telephone 30 on the basis of a reduction in the line voltage.

Meanwhile, when the external telephone 30 is not hooked up until a predetermined number of (for example, three) ringing tones rings after receiving the incoming call, the line is closed by the SDAA 12. At this time, the relay 22 transitions to the relay-on state, so that the connection destination of the external telephone 30 switches from the line side (TA 40 side) to the ringing circuit 24 side. Therefore, the external telephone 30 stops ringing. In this state, the CPU 14 determines whether the arrival of the signal is for facsimile communication or a voice call.

When it is determined on the basis of reception of a CNG signal (signal of 1100 Hz) from the line side that the arrival of the signal is for facsimile communication, facsimile communication starts with the relay 22 in the relay-on state.

On the other hand, in a case where it is determined that the arrival of the signal is for a voice call, not for facsimile communication, a call through the external telephone 30 is not possible in the state in which the relay 22 is in the relay-on state. In this case, the CPU 14 controls the ringing circuit 24 to generate an artificial call signal and to output the artificial call signal to the external telephone 30 through the relay 22, so that the external telephone 30 rings again.

After the external telephone 30 restarts to ring, when the external telephone 30 is hooked up, a current flows between the external telephone 30 and the ringing circuit 24, and the current is detected by the current detecting circuit 23. Then, on the basis of the current detection, the CPU 14 detects hook-up of the external telephone 30, and returns the relay 22 to the normal state (relay-off state) such that the external telephone 30 is connected to the line side (TA 40). Then, while the external telephone 30 is in use for the call (that is, the external telephone 30 is in the hook-up state), the CPU 14 displays 'EXTERNAL TELEPHONE IS IN USE' on the LCD of the display unit 18 and stops receiving facsimile communication.

Next, an operation of the multi-function device 10 when a call is made on the external telephone 30 will be described. When the user hooks the external telephone 30 up to make a call on the external telephone 30, the line is closed by the external telephone 30. Then, a DC closed-loop is formed between the analog port of the TA 40 and the external telephone 30, so that the line voltage is reduced from the steady voltage (about 48V) to several tens of voltages.

When the incoming call is received, as described above, it is possible to perform detection on hook-up of the external telephone 30 on the basis of a reduction in the line voltage. However, in a case where a call is made on the external telephone 30, it is not possible to detect hook-up of the external telephone 30 only from a reduction in the line voltage. The reason is that the line voltage can be reduced not only by hook-up of the external telephone 30 but also by other factors including a transition of the TA 40 to the power saving mode and defects in the connection between the line cables and the line such as disconnection of the line cables from a plug-in phone jack.

When the TA 40 transitions to the power saving mode, the line voltage is reduced to about half of the steady voltage (about 20V). Further, for example, if the phone cables 41 are disconnected from the analog port of the TA 40 (or from the line connection terminal 11 of the multi-function device 10), the line voltage becomes 0V. Thus, in a standby period other than when an incoming call is received, it is not possible to detect hook-up of the external telephone 30 only from a reduction in the line voltage.

When the line voltage is reduced by hook-up of the external telephone 30, a dial tone (for example, a voice signal of 400 Hz) is output from the line side. Thereafter, in the standby period other than when the incoming call is received, the multi-function device 10 of the present exemplary embodiment detects the hook-up of the external telephone 30 on the basis of the reception of the dial tone from the line side, in addition to the reduction of the line voltage. The multi-function device 10 also has a function of determining that there is a defect in the connection between the line cables and the line, in a case where the line voltage is a voltage (for example, 0V) well below about half of the steady voltage, and notifying the determination result to the user.

The function of performing detection on hook-up of the external telephone 30 and the function of detecting defects in the connection between the line cables and the line will be described in detail with reference to operation examples (timing charts) of FIGS. 2A and 2B.

First, the operation example of FIG. 2A will be described. It is assumed that the external telephone 30 is in the on-hook state, and 'IN STANDBY' is being displayed on the LCD of the display unit 18. Further, it is assumed that the line voltage is the steady voltage (48V), and there is no defect in the connection between the line cables and the line.

In this state, if the line cables are disconnected from the line (a defect occurs in the connection between the line cables and the line) at a timing t1, for example, by disconnection of the phone cables 41 from the plug-in phone jack, the line voltage is reduced up to 0V. Then, the CPU 14 detects the reduction of the line voltage through the SDAA 12, and determines that there is any defect in the connection between the line cables and the line. Next, the CPU 14 displays 'PLEASE CHECK CONNECTION STATE OF LINE CABLES' on the LCD, to urge the user to check the line cables.

Thereafter, when the line cables are normally connected to the line again at a timing t2, the line voltage returns to the steady voltage. Then, the CPU 14 detects the return to the steady voltage through the SDAA 12, and returns the contents of the display on the LCD to 'IN STANDBY'.

Thereafter, when the external telephone 30 is hooked up at a timing t3, the line voltage is reduced up to about 20V. At this time, since the TA 40 has the chance to transition to the power saving mode due to the reduction of the line voltage, the CPU 14 cannot determine that the external telephone 30 has been hooked up. After the hook-up of the external telephone 30, when a dial tone DT is received at a timing t4, the CPU 14 detects the hook-up (off-hook) of the external telephone 30, so that the CPU 14 determines that the external telephone 30 is in the hook-up state and displays 'EXTERNAL TELEPHONE IS IN USE' on the LCD while stopping receiving facsimile communication.

Thereafter, when the voice call through the external telephone 30 is terminated and the external telephone 30 becomes the on-hook state at a timing t5, the line is opened by the external telephone 30, and the line voltage returns to the steady voltage again. Then, the CPU 14 detects the return to the steady voltage through the SDAA 12, and returns the contents of the display on the LCD to 'IN STANDBY'.

Next, an operation example of FIG. 2B will be described. In the operation example of FIG. 2B, when communication is not performed for a predetermined time, the TA 40 transitions to the power saving mode at a timing t1. Therefore, the line voltage is reduced up to about 20V.

However, this reduction of the line voltage is not attributable to hook-up of the external telephone (closing of the line). This reduction of the line voltage is attributable to the transition of the TA 40 to the power saving mode. That is, the reduction of the line voltage was made by the power saving function of the TA 40. Therefore, any dial tone is not received from the line side, and the CPU 14 determines that the reduction of the line voltage is attributable to any factor (which is mainly considered as a transition of the TA 40 to the power saving mode) other than hook-up of the external telephone 30, and continuously displays 'IN STANDBY' on the LCD.

Thereafter, for example, when the multi-function device 10 starts facsimile communication or when an incoming call is received from the line side, the TA40 returns from the power saving mode to the normal operation mode at a timing t2, and thus the line voltage returns to the steady voltage.

Figure 3:
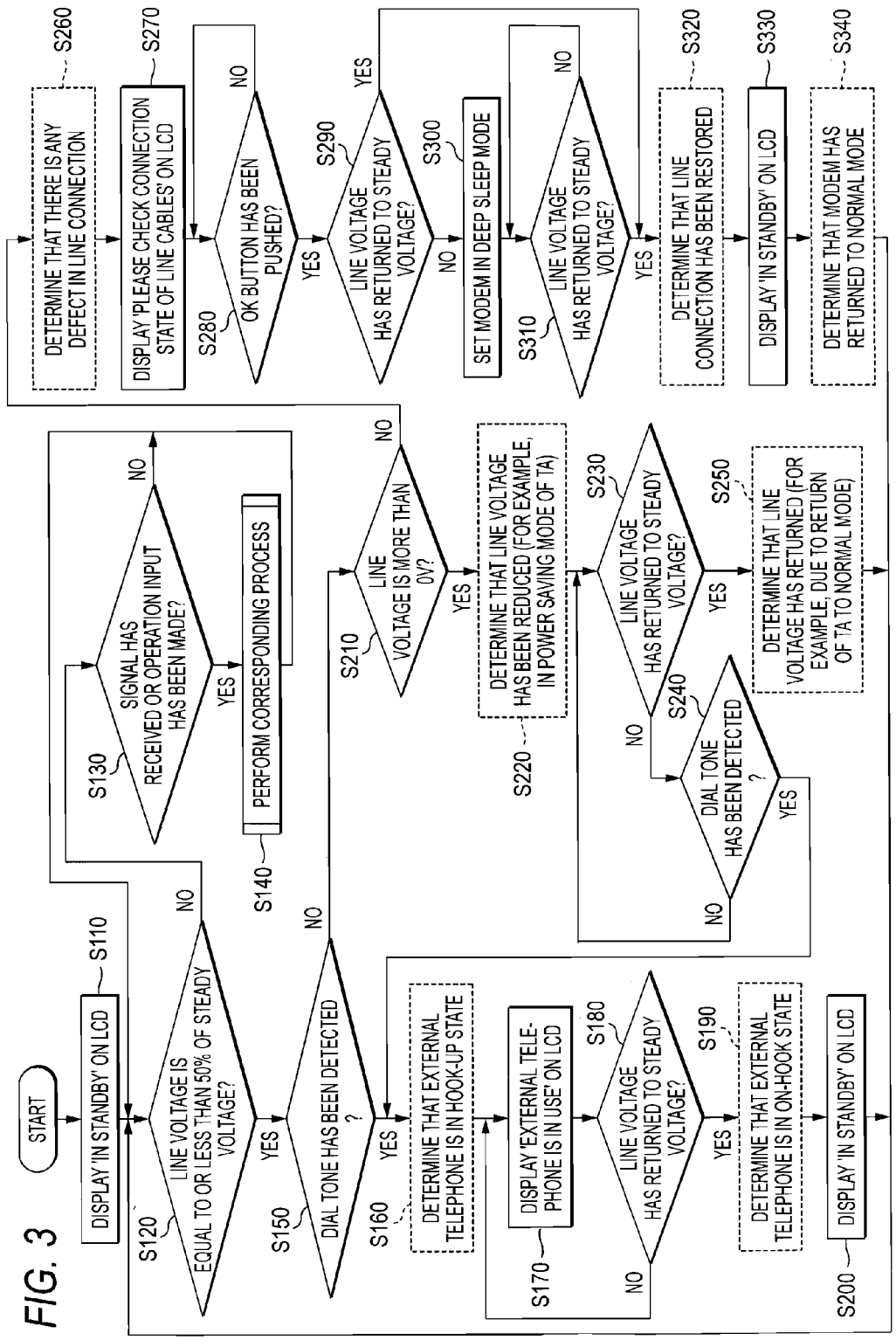
FIG. 3 is a flow chart illustrating a hook-up detecting process of the multi-function device according to the exemplary embodiment.

Next, a hook-up detecting process which the CPU 14 of the multi-function device 10 executes for implementing detection on hook-up of the external telephone 30 or detection on disconnection of the line cables will be described with reference to a flow chart of FIG. 3.

When the CPU 14 starts to operate by power supply, the CPU 14 reads a program for the hook-up detecting process from the ROM 15 and executes the program. In the procedure of performing the hook-up detecting process, if necessary, the CPU 14 appropriately obtains necessary information, such as the line voltage, a dial tone, and the like, from the modem 13 (or from the SDAA 12 through the modem 13).

When starting the hook-up detecting process, first, in STEP S110, the CPU 14 displays 'IN STANDBY' on the LCD of the display unit 18. In other words, after the start of the operation, in an initial state, the CPU 14 waits for various triggers (state changes) such as a reduction in the line voltage, reception of an external signal, and operation input on the operation unit 17.

Specifically, in STEP S120, the CPU 14 determines whether the line voltage is equal to or less than 50% of the steady voltage. After the start of the operation, the CPU 14 monitors the line voltage. When the line voltage does not vary (is stable) for a predetermined time (for example, for three seconds), the CPU 14 sets the voltage value of the line voltage at that time as the steady voltage. In the present exemplary embodiment, as described above, the description will be made on the assumption that the steady voltage is 48V. The voltage value of 50% of the steady voltage is one example of a first threshold value of the present invention.

When the line voltage is more than 50% of the steady voltage (24V), the CPU 14 proceeds to STEP S130, and the CPU 14 determines whether or not a signal has been received from the line side or operation input on the operation unit 17 has been made. When determining that any signal has not been received from the line side and operation input has not been made, the CPU 14 returns to STEP S120; whereas when determining that a signal has been received from the line side or operation input has been made, the CPU 14 proceeds to STEP S140 in which the CPU 14 performs a process corresponding to the reception of the signal or the operation input (corresponding process), and then returns to STEP S120.

On the other hand, when determining in STEP S120 that the line voltage is equal to or less than 50% of the steady voltage, the CPU 14 proceeds to STEP S150, and the CPU 14 determines whether any dial tone has been detected. When determining that a dial tone has been detected, the CPU 14 proceeds to STEP S160 in which the CPU 14 determines that the external telephone 30 is in the hook-up state. Next, in STEP S170, the CPU 14 displays 'EXTERNAL TELEPHONE IS IN USE' on the LCD while stopping the multi-function device 10 from receiving operation for facsimile communication.

Next, in STEP S180, the CPU 14 determines whether the line voltage has returned to the steady voltage. When determining that the line voltage has not returned to the steady voltage, the CPU 14 returns to STEP S170; whereas when determining that the line voltage has returned to the steady voltage, the CPU 14 proceeds to STEP S190, and the CPU 14 determines that the external telephone is in the on-hook state. Next, the CPU 14 displays 'IN STANDBY' on the LCD while stopping the multi-function device 10 from receiving operation for facsimile communication (returning to the normal operation state), in STEP S200, and returns to STEP S120.

On the other hand, when determining in STEP S150 that any dial tone has not been detected, the CPU 14 more accurately determines the state of the line voltage. Specifically, in STEP S210, the CPU 14 determines whether the line voltage is more than 0V. Incidentally, 0V is the reference of the determination and is one example of a second threshold voltage of the present invention. When determining that the line voltage is more than 0V, the CPU 14 proceeds to STEP S220, and the CPU 14 determines that there is no defect in the connection state of the line cables and the reduction of the line voltage is attributable to any factor (such as a transition of the TA 40 to the power saving mode, or the like) other than hook-up of the external telephone 30.

In this case, it can also be considered a probability that since it is immediately after hook-up of the external telephone 30, any dial tone has not yet been reached from the line side (but a dial tone will be reached soon).

For this reason, in STEP S230, the CPU 14 determines whether the line voltage has returned to the steady voltage. When determining that the line voltage has not returned to the steady voltage, the CPU 14 proceeds to STEP S240, and the CPU 14 determines whether any dial tone has been detected. When determining that any dial tone has not been detected, the CPU 14 returns to STEP S230; whereas when determining that a dial tone has been detected, the CPU 14 returns to STEP S160 in which the CPU 14 determines that the external telephone 30 is in the hook-up state, and then performs STEP S170 and the subsequent processes (that is, display of 'EXTERNAL TELEPHONE IS IN USE' on the LCD, and the like).

When determining in STEP S230 that the line voltage has returned to the steady voltage, the CPU 14 proceeds to STEP S250, and the CPU 14 determines that the line voltage has returned from the reduced state to the normal state due to any factor (for example, return of the TA 40 from the power saving mode to the normal mode) other than hook-up of the external telephone 30, and then returns to STEP S120.

On the other hand, when determining in STEP S210 that the line voltage is not more than 0V (that is, the line voltage is 0V), the CPU 14 determines that there is any defect in the line connection in STEP S260, and the CPU 14 displays 'PLEASE CHECK CONNECTION STATE OF LINE CABLES' on the LCD in STEP S270. Thereafter, in STEP S280, the CPU 14 determines whether an OK button of the operation unit 17 has been pushed by the user. When determining that the OK button has been pushed, the CPU 14 proceeds to STEP S290, and the CPU 14 determines whether the line voltage has returned to the steady voltage.

When determining in STEP S290 that the line voltage has not returned to the steady voltage, the CPU 14 proceeds to STEP S300, and the CPU 14 sets the modem 13 in a deep sleep mode. Next, in STEP S310, the CPU 14 determines whether the line voltage has returned to the steady voltage.

The modem 13 has, as operation modes, a normal mode in which transmission and reception of facsimile signals are possible, and power saving modes in which power consumption is less than that in the normal mode. The power saving modes include at least a sleep mode, and the deep sleep mode in which power consumption is less than that in the sleep mode. Although how to switch the mode among the operation modes will be not be described in detail, the modem 13 is configured to transition to the deep sleep mode in response to an instruction from the CPU 14 in a case where the CPU 14 determines that there is any defect in the line connection when the modem 13 is in the normal mode. After the transition to the deep sleep mode, when the line voltage returns to the steady voltage, the modem 13 detects the return to the steady voltage and returns to the normal mode.

Meanwhile, when determining in STEP S290 or STEP S310 that the line voltage has returned to the steady voltage, the CPU 14 proceeds to STEP S320, and the CPU 14 determines that the line connection has been restored (that is, the connection state of the line cables is normal). Next, in STEP S330, the CPU 14 displays 'IN STANDBY' on the LCD. Also, when the line voltage returns to the steady voltage, the modem 13 automatically transitions from the deep sleep mode to the normal operation mode. Therefore, the CPU 14 determines that the modem 13 has returned from the deep sleep mode to the normal operation mode, in STEP S340, and then returns to STEP S120.

As described above, the multi-function device 10 of the present exemplary embodiment performs detection on hook-up of the external telephone 30 on the basis of both of a reduction in the line voltage and detection on a dial tone, unlike the related art in which detection on hook-up is performed on the basis of only a reduction in the line voltage. Therefore, even if the line voltage is reduced due to any factor (for example, a transition of the TA 40 to the power saving mode, any defect in the connection between the line cables and the line, or the like) other than hook-up of the external telephone 30, it is possible to prevent that it is erroneously detected that the external telephone 30 has been hooked up, on the basis of the reduction of the line voltage, and to accurately detect hook-up of the external telephone 30.

As a condition of detection on hook-up of the external telephone 30, a dial tone is used. However, it is not essential to use the dial tone, and it is possible to use various other signals and the like transmittable and receivable between the external telephone 30 and the line side after hook-up of the external telephone 30. However, a dial tone is a signal that is generally first input among various signals and the like transmittable and receivable after hook-up of the external telephone 30. For this reason, when detection on hook-up is performed by detecting a dial tone after detection of a reduction in the line voltage, it is possible to quickly detect hook-up of the external telephone 30.

In a case of determining that the line voltage is equal to or less than 50% of the steady voltage, the multi-function device 10 of the present exemplary embodiment determines whether the line voltage is more than 0V, so as to determine the connection state of the line cables. Therefore, in a case where the line voltage is reduced (to 0V) by any defect in the connection between the line cables and the line, the detailed contents is displayed on the LCD. Therefore, it is possible to enhance the added value of the multi-function device 10.

In the multi-function device 10 of the present exemplary embodiment, when the line voltage is reduced to 0V due to any defect in the line connection, the modem 13 is set in the deep sleep mode until the line voltage returns to the steady voltage. Therefore, it is possible to suppress the power consumption of the modem 13 in the state where there is any defect in the line connection and thus facsimile communication is impossible.

Also, when hook-up of the external telephone 30 is detected, 'EXTERNAL TELEPHONE IS IN USE' is displayed on the LCD. Therefore, the user can accurately recognize that the external telephone 30 is in the hook-up state.

Further, it is possible for the multi-function device 10 of the present exemplary embodiment to accurately detect hook-up of the external telephone 30 on the basis of the line voltage. Therefore, unlike the related art, it is unnecessary to provide a current detecting circuit on the primary side and perform detection on hook-up by the current detecting circuit. Accordingly, it is possible to provide a current detecting circuit on the secondary side. Therefore, it is unnecessary to configure, as the current detecting circuit, a large and expensive circuit using components such as an optical coupler for insulting, and it is possible to configure an inexpensive and small circuit as the current detecting circuit.

<Modifications to Exemplary Embodiments>

Exemplary embodiments of the present invention can be modified in various forms within a technical scope of the present invention.

For example, in the above-described exemplary embodiment, the reference value for the line voltage for performing detection on hook-up of the external telephone 30 is set to 50% of the steady voltage; however, this is merely illustrative. The reference value may be appropriately determined according to the line voltage considerable in a case where the external telephone 30 is hooked up.

As for the steady voltage, in the above-described exemplary embodiment, after the start of the operation, the CPU 14 monitors the line voltage, and when the line voltage does not vary (is stable) for a predetermined time (for example, for three seconds), the CPU 14 sets the voltage value of the line voltage at that time as the steady voltage; however, this is merely illustrative. The steady voltage can be set in various different ways. For example, the steady voltage may be set to a constant value (for example, 48V) in advance.

In the above-described exemplary embodiment, the reference value for the line voltage for determining whether there is any defect in the connection between the line cables and the line is set to 0V; however, this is merely illustrative.

Also, in the above-described exemplary embodiment, in a case where hook-up of the external telephone 30 is detected, 'EXTERNAL TELEPHONE IS IN USE' is displayed on the LCD. However, the display contents can be appropriately set. Also, in order to notify the state of the external telephone, for example, that the external telephone is in use, not only display on the LCD but also various other methods, such as a method using voice and a method using both of voice and display on an LCD, may be used. This is the same even for the case of displaying 'PLEASE CHECK CONNECTION STATE OF LINE CABLES' on the LCD when there is any defect in the line connection.

What is claimed is:

1. A communication apparatus which is configured to be connected to a phone line, and to which an external telephone is connectable to, the communication apparatus comprising:
    a line-voltage detecting unit configured to detect a line voltage which is a voltage of the phone line;
    a communication-signal detecting unit configured to perform detection on a dial tone, which is input to the communication apparatus from the phone line upon the external telephone being hooked up; and
    a control device configured to perform a hook-up determining process of determining that the external telephone is in a hook-up state when the line voltage detected by the line-voltage detecting unit is equal to or less than a first threshold value and the dial tone is detected by the communication-signal detecting unit.

2. The communication apparatus according to claim 1, wherein the control device is configured to further perform:
    a voltage determining process of determining whether the line voltage detected by the line-voltage detecting unit is equal to or less than a second threshold value that is smaller than the first threshold value; and
    a line-connection-state determining process of determining that a connection state between the communication apparatus and the phone line is not connection when the voltage determining process determines that the line voltage is equal to or less than the second threshold value.

3. The communication apparatus according to claim 2,
wherein the control device is configured to further perform
a connection-state notifying process of notifying that the connection state is not connection if the line-connection-state determining process determines that the connection state is not connection.

4. The communication apparatus according to claim 2, further comprising:
a facsimile transceiver unit configured to perform transmission and reception of facsimile signals,
wherein the facsimile transceiver unit includes, as operation modes, at least:
a normal mode in which transmission and reception of the facsimile signals are possible; and
a power saving mode in which power consumption is less than that in the normal mode, and
wherein if the line-connection-state determining process determines that the connection state is not connection when the facsimile transceiver unit is in the normal mode, the facsimile transceiver is configured to perform transition to the power saving mode.

5. The communication apparatus according to claim 1,
wherein the control device is configured to further perform a hook-up notifying process of notifying that the external telephone is in the hook-up state when the hook-up determining process determines that the external telephone is in the hook-up state.

6. A multi-function device which is configured to be connected to a phone line via a communication relaying apparatus and to which an external telephone is connectable to, wherein the multi-function device comprises a printing unit, a scanner unit, and a facsimile transceiver unit configured to perform transmission and reception of facsimile signals, and wherein the communication relaying apparatus is configured to apply voltage to a multi-function device-side phone line and has a power saving function of reducing the voltage applied to the multi-function device-side phone line, the multi-function device comprising:
a line-voltage detecting unit configured to detect a line voltage which is a voltage of the phone line applied by the communication relaying apparatus;
a communication-signal detecting unit configured to perform detection on a dial tone, which is input to the multi-function device from the phone line via the communication relaying apparatus upon the external telephone being hooked up;
a hook-up determining unit configured to determine that the external telephone is in a hook-up state when the line voltage detected by the line-voltage detecting unit is equal to or less than a first threshold value and the dial tone is detected by the communication-signal detecting unit;
a voltage determining unit configured to determine whether the line voltage detected by the line-voltage detecting unit is equal to or less than a second threshold value that is less than the first threshold value; and
a line-connection-state determining unit configured to determine that a connection state between the multi-function device and the phone line is non-connection when the voltage determining unit determines that the line voltage is equal to or less than the second threshold value.

7. The multi-function device according to claim 6, further comprising:
a hook-up notifying unit configured to notify that the external telephone is in the hook-up state when the hook-up determining unit determines that the external telephone is in the hook-up state.

8. The multi-function device according to claim 7, further comprising:
a connection-state notifying unit configured to notify that the connection state is not connection if the line-connection-state determining unit determines that the connection state is not connection.

9. The multi-function device according to claim 8,
wherein the facsimile transceiver unit includes, as operation modes, at least:
a normal mode in which transmission and reception of the facsimile signals are possible; and
a power saving mode in which power consumption is less than that in the normal mode, and
wherein if the line-connection-state determining unit determines that the connection state is not connection when the facsimile transceiver unit is in the normal mode, the facsimile transceiver is configured to perform transition to the power saving mode.

* * * * *